(12) United States Patent
Wang et al.

(10) Patent No.: US 8,435,620 B2
(45) Date of Patent: May 7, 2013

(54) OPTICAL RECORDING MEDIUM AND RECORDING MATERIAL FOR THE SAME

(75) Inventors: Wei-Hsiang Wang, Hsinchu (TW); Po-Fan Hsu, Hsinchu (TW); Wei-Chong Li, Hsinchu (TW)

(73) Assignee: Ritek Corporation, Hsinchu (TW)

( * ) Notice: Subject to any disclaimer, the term of this patent is extended or adjusted under 35 U.S.C. 154(b) by 27 days.

(21) Appl. No.: 13/228,469

(22) Filed: Sep. 9, 2011

(65) Prior Publication Data

US 2013/0065008 A1    Mar. 14, 2013

(51) Int. Cl.
*G11B 7/24*    (2006.01)

(52) U.S. Cl.
USPC ....... 428/64.1; 428/64.4; 428/64.5; 428/64.6; 430/270.13

(58) Field of Classification Search .................. 428/64.4; 430/270.13
See application file for complete search history.

(56) References Cited

U.S. PATENT DOCUMENTS 8,227,067 B2 *    7/2012    Hayashi et al. ............. 428/64.1

\* cited by examiner

*Primary Examiner* — Elizabeth Mulvaney
(74) *Attorney, Agent, or Firm* — CKC & Partners Co., Ltd.

(57) ABSTRACT

Disclosed herein is a recording material for an optical recording medium. The recording material has a composition represented by a general formula of $Bi_xGe_yO_{(1-x-y)}$, in which x and y respectively are atomic ratios of bismuth and germanium, and satisfy the requirements of the following formulae: $2.8 \leq (x/y) \leq 25$ and $0.55 \leq (1-x-y) \leq 0.62$.

12 Claims, 2 Drawing Sheets

OPTICAL RECORDING MEDIUM AND RECORDING MATERIAL FOR THE SAME

BACKGROUND

1. Technical Field

The present disclosure relates to a recording material and an optical recording medium.

2. Description of Related Art

Information recording media such as compact discs (CDs) and digital versatile discs (DVDs) have been widely used. In recent years, techniques have been developed for increasing the recording capacity and the recording density of these discs. One approach for increasing recording capacity is to decrease the track pitch and/or the pit size in the disc. Another approach is to manufacture a multiple-layered recording structure, that is, a structure which has multiple recording layers, such that spatial efficiency is enhanced. However, with such a multiple-layered structure, the recording material requires a high transmittance and a reliable phase change when being irradiated by a laser beam. Conventional recording materials, unfortunately, cannot meet these requirements, and therefore there exists in this art a need for a new material, which would allow for successful use in such a multiple-layered structure.

SUMMARY

According to one aspect of the present disclosure, a recording material for an optical recording medium is provided. The recording material has a composition represented by a general formula of $Bi_xGe_yO_{(1-x-y)}$, in which x and y respectively represent atomic ratios of bismuth and germanium, and satisfy the requirements of the following formulae: $2.8 \leq (x/y) \leq 25$ and $0.55 \leq (1-x-y) < 0.62$.

In one embodiment of the present disclosure, the recording material has an extinction coefficient of less than or equal to 0.3, and a refractive index of about 2.5 to about 3.

In one embodiment of the present disclosure, x and y in the general formula satisfy the requirements of the following formulae: $0.2 \leq x \leq 0.4$ and $0.01 \leq y \leq 0.15$.

According to another aspect of the present disclosure, an optical recording medium is provided. The optical recording medium comprises a substrate and a recording layer disposed over the substrate. The recording layer has an extinction coefficient of less than or equal to 0.3 and comprises a material represented by a composition formula of $Bi_xGe_yO_{(1-x-y)}$, in which x and y respectively represent atomic ratios of bismuth and germanium, and satisfy the requirements of the following formulae: $2.8 \leq (x/y) \leq 25$ and $0.55 \leq (1-x-y) < 0.62$.

In one embodiment of the present disclosure, the optical recording medium further comprises a dielectric layer in contact with the recording layer. The dielectric layer has a refractive index of about 2.0 to about 2.5 and the recording layer has a refractive index of about 2.5 to about 3.0.

According to another aspect of the present disclosure, an optical recording medium is provided. The optical recording medium comprises a substrate, a first passivation layer, a second passivation layer, a dielectric layer and a recording layer. The first passivation layer is disposed on the substrate. The second passivation layer is disposed over the first passivation layer. The dielectric layer is disposed between the first and the second passivation layers, and has a refractive index of about 2.0 to about 2.5. The recording layer is in contact with the dielectric layer, and has a refractive index of about 2.5 to about 3.0. The recording layer comprises a material represented by a composition formula of $Bi_xGe_yO_{(1-x-y)}$, in which x and y respectively represent atomic ratios of bismuth and germanium, and satisfy the requirements of the following formulae: $2.8 \leq (x/y) \leq 2.5$ and $0.55 \leq (1-x-y) < 0.62$.

In one embodiment of the present disclosure, each of the first and second passivation layers has a refractive index of about 2.0 to about 2.7.

In one embodiment of the present disclosure, a difference between the refractive index of the recording layer and the refractive index of the dielectric layer is about 0.25 to about 0.55.

In one embodiment of the present disclosure, at least one of the first and second passivation layers comprises at least one material selected from the group consisting of zinc sulfide (ZnS), silicon dioxide ($SiO_2$), chromium oxide ($Cr_2O_3$), zirconium dioxide ($ZrO_2$), titanium dioxide ($TiO_2$), niobium pentaoxide ($Nb_2O_5$), tantalum pentoxide ($Ta_2O_5$), indium oxide ($In_2O_3$), zinc oxide (ZnO), tin dioxide ($SnO_2$), cerium dioxide ($CeO_2$) and aluminum oxide ($Al_2O_3$).

In one embodiment of the present disclosure, the dielectric layer comprises at least one material selected from the group consisting of zinc sulfide (ZnS), silicon dioxide ($SiO_2$), chromium oxide ($Cr_2O_3$), zirconium dioxide ($ZrO_2$), titanium dioxide ($TiO_2$), niobium pentaoxide ($Nb_2O_5$), tantalum pentoxide ($Ta_2O_5$), indium oxide ($In_2O_3$), zinc oxide (ZnO), tin dioxide ($SnO_2$), cerium dioxide ($CeO_2$) and aluminum oxide ($Al_2O_3$).

In one embodiment of the present disclosure, the dielectric layer has a thickness of about 30 nm to about 40 nm.

In one embodiment of the present disclosure, the recording layer has a thickness of about 15 nm to about 30 nm.

According to another aspect of the present disclosure, an optical recording medium is provided. The optical recording medium comprises in sequence a substrate and a first, a second and a third recording structure. The first recording structure comprises a first dielectric layer and a first recording layer. The first dielectric layer is disposed over the substrate, and the first recording layer is disposed on and in contact with the first dielectric layer. The second recording structure is located above the first recording structure, and comprises a second dielectric layer and a second recording layer. The second dielectric layer is disposed over the first recording layer, and the second recording layer is disposed on and in contact with the second dielectric layer. The third recording structure is arranged above the second recording structure, and comprises a third dielectric layer and a third recording layer. The third dielectric layer is disposed over the second recording layer, and the third recording layer is disposed on and in contact with the third dielectric layer. Each of the first, second and third recording layers has an extinction coefficient of less than or equal to 0.3 and comprises a material represented by a composition formula of $Bi_xGe_yO_{(1-x-y)}$, in which x and y respectively represent atomic ratios of bismuth and germanium, and satisfy the requirements of the following formulae: $2.8 \leq (x/y) \leq 25$ and $0.55 \leq (1-x-y) < 0.62$. Each of the first, second and third dielectric layers has a refractive index of about 2.0 to about 2.5.

In one embodiment of the present disclosure, the optical recording medium further comprises a first, a second, a third, a fourth, a fifth and a sixth passivation layer. The first and second passivation layers are respectively disposed below and above the first recording structure. The third and fourth passivation layers are respectively disposed below and above the second recording structure. The fifth and sixth passivation layers are respectively disposed below and above the third recording structure.

In one embodiment of the present disclosure, each of the first, second, third, fourth, fifth and sixth passivation layers has a refractive index of about 2.0 to about 2.7.

In one embodiment of the present disclosure, x and y in the composition formula satisfy the requirements of the following formulae: $0.2 \leq x \leq 0.4$ and $0.01 \leq y \leq 0.15$.

In one embodiment of the present disclosure, the third recording layer has a thickness less than a thickness of each of the first and second recording layers.

In one embodiment of the present disclosure, each of the first, second and third dielectric layers has a thickness greater than a thickness of each of the first, second and third recording layers.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

According to one aspect of the present disclosure, a recording material, for an optical recording medium is disclosed. The composition of the recording material may be represented by a general formula of $Bi_xGe_yO_{(1-x-y)}$, in which x and y respectively represent atomic ratios of bismuth and germanium. The "x" and "y" in the general formula satisfy the requirements of the following formulae: $2.8 \leq (x/y) \leq 25$ and $0.55 \leq (1-x-y) < 0.62$. The recording material disclosed herein may be applied in a multiple-layered recording structure.

Particularly, the atomic ratio of oxygen (1−x−y) in the material ($Bi_xGe_yO_{(1-x-y)}$) is less than 0.62 and greater than or equal to 0.55. Furthermore, the atomic ratio of bismuth to germanium (x/y) is ranged from 2.8 to 25.

In one embodiment, the atomic ratio of bismuth (x) and the atomic ratio of germanium (y) in the general formula satisfy the requirements of the following formulae: $0.2 \leq x \leq 0.4$ and $0.01 \leq y \leq 0.15$.

In another embodiment, the material has an extinction coefficient of less than or equal to 0.3. The term "extinction coefficient" herein refers to the imaginary part of the complex index of refraction, which also relates to light absorption.

Figure 1:
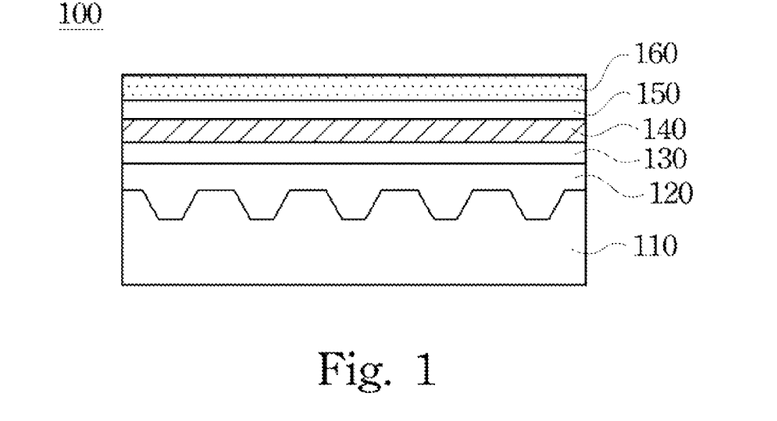
FIG. 1 is a cross-sectional view schematically illustrating an optical recording medium according to one embodiment of the present disclosure.

According to another aspect of the present disclosure, an optical recording medium is disclosed. FIG. 1 is a cross-sectional view schematically illustrating an optical recording medium 100 according to one embodiment of the present disclosure. The optical recording medium 100 comprises a substrate 110 and a recording layer 140 disposed over the substrate 110.

The substrate 110 has a plurality of grooves thereon, which are provided as tracks of the optical recording medium 100. The substrate 110 may be typically 1.1 mm in thickness. Suitable materials for the substrate 110 include, but are not limited to, polycarbonate resin, acryl resin, epoxy resin, polystyrene resin, polyethylene resin, polypropylene resin, silicone resin, fluorine-based resin, ABS resin, and urethane resin.

The recording layer 140 comprises a recording material. An optical property of the recording material, such as reflectance and transmittance, may be changed when the recording material is irradiated by a laser beam. Specifically, a laser beam may lead to a phase change in the recording material, and therefore the irradiated region has a different optical characteristic from other regions that are not irradiated. Through such a process, data may be "written" on the recording layer by a laser beam.

The recording material may be represented by a composition formula of $Bi_xGe_yO_{(1-x-y)}$, in which x and y respectively represent atomic ratios of bismuth and germanium. The "x" and "y" in the composition formula satisfy the requirements of the following formulae: $2.8 \leq (x/y) \leq 25$ and $0.55 \leq (1-x-y) < 0.62$. Particularly, the recording material disclosed herein may be applied in a multiple-layered recording structure, and may decrease the error rate of writing and/or reading. The error rate may be measured as a Random Symbol Error Rate (RSER). A higher numerical value of RSER means more error data is present in a recording layer.

Figure 3:
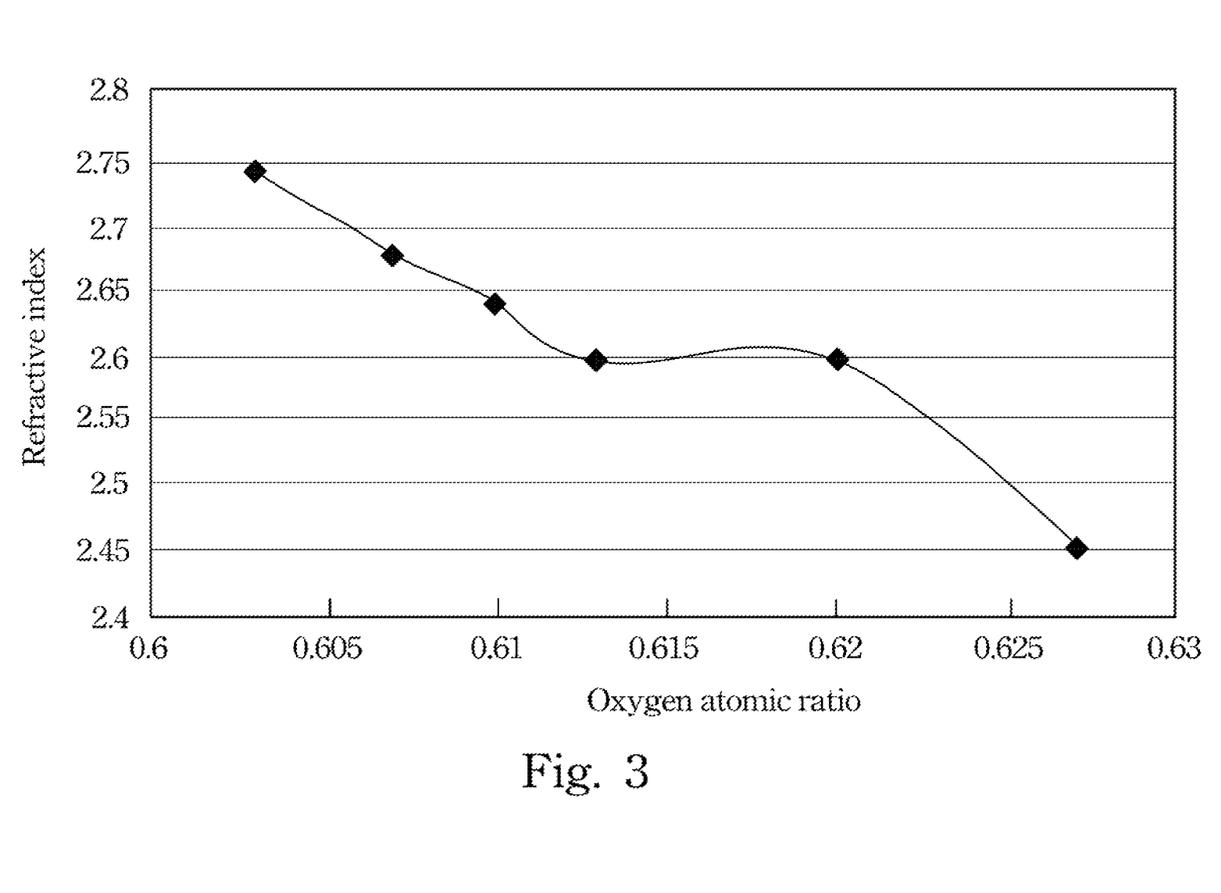
FIG. 3 is a graph showing the relationship between the atomic ratio of oxygen and the refractive index of recording material according to experimental examples of the present disclosure.

The oxygen atomic ratio (1−x−y) of the recording material should be less than 0.62. FIG. 3 is a graph showing the relationship between the atomic ratio of oxygen and the refractive index of the recording material according to experimental examples of the present disclosure. When the oxygen atomic ratio (1−x−y) is greater than 0.62, the refractive index of the recording material is too low, and it is therefore difficult to apply the recording material in a multiple-layered recording structure, especially in a three-layered recording structure. However, the oxygen atomic ratio (1−x−y) of the recording material should be greater than 0.55 so that the refractive index is within an acceptable range. In one embodiment, the refractive index of the recording material may be about 2.5 to about 3.

It is important that the atomic ratio of bismuth to germanium (x/y) of the recording material is in the range of from 2.8 to 25 as the oxygen atomic ratio (1−x−y) is less than 0.62. When atomic ratio of bismuth to germanium (x/y) is outside of this range, the material may not exhibit a clear difference in optical properties between an irradiated region and an unirradiated region.

In one embodiment, it is preferred that the recording material has an extinction coefficient of less than or equal to 0.3. Specifically, a laser beam may be transmitted through several recording layers without being significantly absorbed when the extinction coefficient of the recording layers is not greater than 0.3. Accordingly, the laser beam may possess sufficient energy to make an effective "writing" on another underlying recording layer, and thus the recording material is suitable for a multiple-layered recording structure. In one example, the "x" and "y" of the composition formula of the recording material satisfy the requirements of the following formulae: $0.2 \leq x \leq 0.4$ and $0.01 \leq y \leq 0.15$ as well.

In some examples, the thickness of the recording layer 140 may be about 15 nm to about 30 nm. When the thickness of the recording layer 140 is below this range, data is unable to be correctly written on the recording layer 140, and thus the random symbol error rate (RSER) is at an unacceptable level. On the other hand, when the thickness of the recording layer 140 exceeds this range, the transmittance would be decreased, leading to unfavorable conditions for the recording structure having multiple recording layers.

In one embodiment, the optical recording medium 100 may further include a dielectric layer 130 that is in contact with the recording layer 140. The dielectric layer 130 may facilitate increasing the precision of writing when a laser beam is irradiated on the recording layer 140. The dielectric layer 130 disclosed herein is designed to operate in coordination with the recording layer 140. In one embodiment, the refractive index of the dielectric layer 130 is about 2.0 to about 2.5 when the refractive index of the recording layer 140 is about 2.5 to about 3.0. In one specific example, a difference between the refractive index of the recording layer 140 and the refractive index of the dielectric layer 130 is about 0.25 to about 0.55, specifically about 0.3 to 0.5. While FIG. 1 illustrates that the dielectric layer 130 is positioned under the recording layer 140, the dielectric layer 130 may be disposed either above or beneath the recording layer 140. In examples, the dielectric layer 130 may be about 30 nm to about 40 nm in thickness. The thickness may be set to optimize cooperation with the recording layer 140. It is noted that the optical recording medium 100 depicted in FIG. 1 does not include any type of metallic reflecting layer as used in the prior art.

Suitable materials for the dielectric layer 130 include, but are not limited to, zinc sulfide (ZnS), silicon dioxide ($SiO_2$), chromium oxide ($Cr_2O_3$), zirconium dioxide ($ZrO_2$), titanium dioxide ($TiO_2$), niobium pentaoxide ($Nb_2O_5$), tantalum pentoxide ($Ta_2O_5$), indium oxide ($In_2O_3$), zinc oxide (ZnO), tin dioxide ($SnO_2$), cerium dioxide ($CeO_2$), aluminum oxide ($Al_2O_3$) and a combination thereof.

In one embodiment, the optical recording medium 100 further includes a first passivation layer 120 and a second passivation layer 150, as depicted in FIG. 1. The first passivation layer 120 is formed on the substrate 110, whereas the second passivation layer 150 is disposed over the first passivation layer 120. As mentioned above, since the dielectric layer 130 may be disposed above or beneath the recording layer 140, the dielectric layer 130 may be located between the first passivation layer 120 and the recording layer 140, or between the second passivation layer 150 and the recording layer 140. The first and second passivation layers 120, 150 may prevent moisture from reaching the recording layer 140, and thus prevent corrosion of and other damage to the recording layer 140. In one example, the refractive indexes of the first and second passivation layers 120, 150 are in the range of 2.0 to 2.7. The refractive index of the first passivation layer 120 may be the same as or different from that of the second passivation layer 150. In another example, the refractive index of the first passivation layer 120 is greater than that of the dielectric layer 130.

Suitable materials for the first and second passivation layers 120, 150 include, but are not limited to, zinc sulfide (ZnS), silicon dioxide ($SiO_2$), chromium oxide ($Cr_2O_3$), zirconium dioxide ($ZrO_2$), titanium dioxide ($TiO_2$), niobium pentaoxide ($Nb_2O_5$), tantalum pentoxide ($Ta_2O_5$), indium oxide ($In_2O_3$), zinc oxide (ZnO), tin dioxide ($SnO_2$), cerium dioxide ($CeO_2$) and aluminum oxide ($Al_2O_3$).

The optical recording medium 100 may further include a transparent covering layer 160 disposed on the second passivation layer 150. The transparent covering layer 160 may be made of UV curable acrylic resin or UV curable epoxy resin. The thickness of the transparent covering layer 160 may be about 50 μm to about 100 μm.

Figure 2:
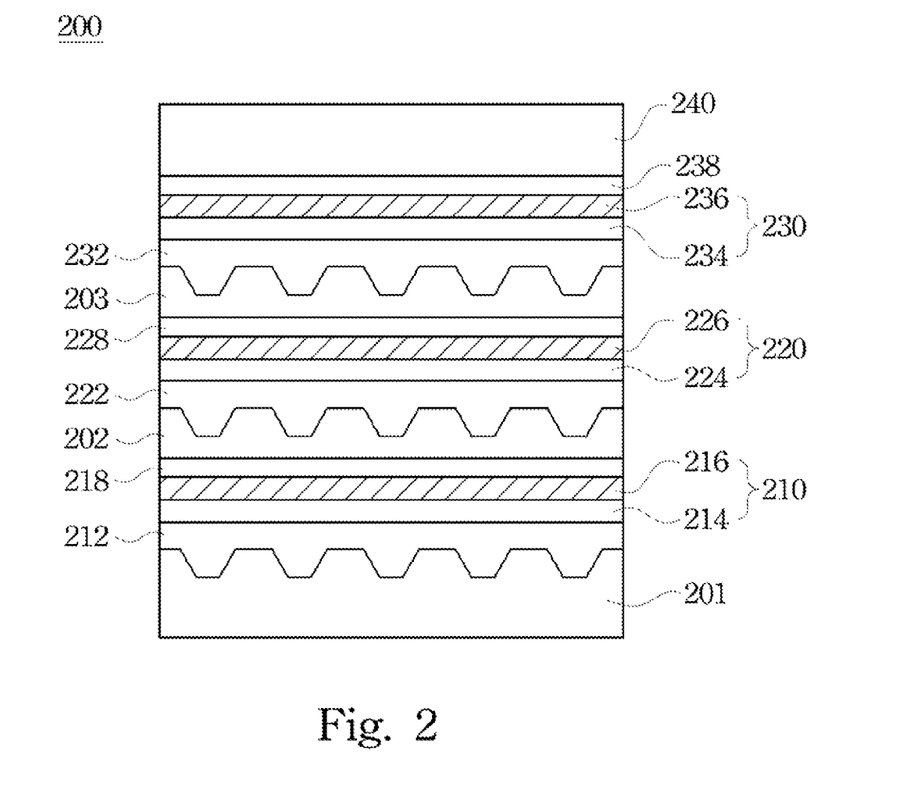
FIG. 2 is a cross-sectional view schematically illustrating an optical recording medium according to another embodiment of the present disclosure.

FIG. 2 is a cross-sectional view schematically illustrating an optical recording medium 200 according to another embodiment of the present disclosure. The optical recording medium 200 comprises in sequence a substrate 201, a first recording structure 210, a second recording structure 220 and a third recording structure 230.

The substrate 201 may be the same as the substrate 110 described above in connection with FIG. 1.

The first recording structure 210 comprises a first dielectric layer 214 and a first recording layer 216. The first dielectric layer 214 is disposed over the substrate 201, and the first recording, layer 216 is disposed on and in contact with the first dielectric layer 214. The second recording structure 220 is positioned above the first recording structure 210, and comprises a second dielectric layer 224 and a second recording layer 226. The second dielectric layer 224 is disposed over the first recording layer 216, and the second recording layer 226 is disposed on and in contact with the second dielectric layer 224. Similarly, the third recording structure 230 is arranged above the second recording structure 220, and comprises a third dielectric layer 234 and a third recording layer 236. The third dielectric layer 234 is disposed over the second recording layer 226, and the third recording layer 236 is disposed on and in contact with the third dielectric layer 234. In this embodiment, each of the first, second and third recording layers 216, 226, 236 has an extinction coefficient of less than or equal to 0.3 and comprises a material represented by a composition formula of $Bi_xGe_yO_{(1-x-y)}$, in which x and y respectively represent atomic ratios of bismuth and germanium. As mentioned above, the atomic ratio of bismuth (x) and the atomic ratio of germanium (y) satisfy the requirements of the following formulae: $2.8 \leq (x/y) \leq 25$ and $0.55 \leq (1-x-y) < 0.62$. Moreover, each of the first, second and third dielectric layers 214, 224, 234 has a refractive index of about 2.0 to about 2.5.

In one example, the thickness of each of the dielectric layers 214, 224, 234 is greater than the thickness of each of the recording layers 216, 226, 236. Specifically, the recording layers 216, 226, 236 may be about 15 nm to about 30 nm in thickness, and the dielectric layers 214, 224, 234 may be about 30 nm to about 40 nm in thickness. In another example, the third recording layer 236, which is the uppermost recording layer, has a thickness less than that of each of the other recording layers 216, 226.

In one embodiment, the optical recording medium 200 further comprises a first passivation layer 212, a second passivation layer 218, a third passivation layer 222, a fourth passivation layer 228, a fifth passivation layer 232 and a sixth passivation layer 238. The first and second passivation layers 212, 218 are respectively disposed below and above the first recording structure 210. Similarly, the third and fourth passivation layers 222, 228 are respectively disposed below and above the second recording structure 220. Also, the fifth and sixth passivation layers 232, 238 are respectively disposed below and above the third recording structure 230. In some examples, each of the first, second, third, fourth, fifth and sixth passivation layers 212, 218, 222, 228; 232, 238 has a refractive index of about 2.0 to about 2.7.

In another embodiment, the optical recording medium 200 further comprises a first spacer layer 202, a second spacer layer 203 and a transparent covering layer 240 respectively disposed on the second, fourth and sixth passivation layers 218, 228, 238. The first and second spacer layers 202, 203 and the transparent covering layer 240 may be made of transparent UV curable resin. In addition, the first and second spacer layers 202, 203 and the transparent covering layer 240 are respectively 20-30 μm, 15-25 μm and 50-60 μm in thickness.

EXAMPLES

The following Examples are provided to illustrate certain aspects of the present invention and to aid those of skill in the art in practicing this invention. These Examples are in no way to be considered to limit the scope of the invention in any manner.

Examples 1-6

A plurality of optical recording mediums were manufactured according to the embodiments described above. In Examples 1-6, the optical recording mediums had a structure with a single recording layer, as depicted in FIG. 1. The substrate was made of polycarbonate resin and fabricated by an injection molding process. The thickness of the substrate was 1.1 mm. A number of grooves, each having a depth of 20 nm, were formed on a surface of the substrate. The first passivation layer, the dielectric layer, the recording layer and the second passivation layer were sequentially formed on the substrate by sputtering processes. Next, a transparent covering layer (i.e., UV curable resin) was formed on the second passivation layer. Finally, the error rate (RSER) of these optical recording mediums were measured using the optical disc evaluator manufactured by PLUSTEC Industrial Co., Ltd., that is, the ODU-1000. The important parameters of Examples 1-6 are summarized in Table 1.

In Examples 1-6, the recording layers were made of materials with different compositions. The first and second passivation layers were made of $TiO_2$. The dielectric layer was formed by sputtering a target comprising ZnS and $SiO_2$, in which the contents of ZnS and $SiO_2$ were respectively 80 mol % and 20 mol %. The recording materials of Examples 1-5 had oxygen contents of less than 0.62. All optical recording mediums of Examples 1-6 may be utilized as a result of exhibiting low error rates (RSER) in the range of about $10^{-3}$ to about $10^{-4}$. Of particular interest is Example 2 which exhibited an error rate of $1.65 \times 10^{-4}$.

TABLE 1

| | | Example | | | | | |
|---|---|---|---|---|---|---|---|
| | | 1 | 2 | 3 | 4 | 5 | 6 |
| First passivation layer | Material | | | $TiO_2$ | | | |
| | Refractive index | | | 2.5 | | | |
| | Extinction coefficient | | | 0.06 | | | |
| | Thickness (nm) | | | 19.1 | | | |
| Dielectric layer | Material | | | $ZnS$—$SiO_2$ | | | |
| | Refractive index | | | 2.3 | | | |
| | Extinction coefficient | | | 0.006 | | | |
| | Thickness (nm) | | | 35 | | | |
| Recording layer | Material | $Bi_{38}Ge_{1.7}O_{60.3}$ | $Bi_{36}Ge_{3.3}O_{60.7}$ | $Bi_{34}Ge_{5.0}O_{61.0}$ | $Bi_{32}Ge_{6.7}O_{61.3}$ | $Bi_{28}Ge_{10.0}O_{62.0}$ | $Bi_{24}Ge_{13.3}O_{62.7}$ |
| | Refractive index | 2.75 | 2.68 | 2.64 | 2.59 | 2.59 | 2.44 |
| | Extinction coefficient | 0.125 | 0.125 | 0.125 | 0.125 | 0.125 | 0.125 |
| | Thickness (nm) | 22 | 22 | 22 | 22 | 22 | 22 |
| Second passivation layer | Material | | | $TiO_2$ | | | |
| | Refractive index | | | 2.5 | | | |
| | Extinction coefficient | | | 0.06 | | | |
| | Thickness (nm) | | | 14.6 | | | |
| RSER result | | $4.68 \times 10^{-4}$ | $1.65 \times 10^{-4}$ | $2.68 \times 10^{-4}$ | $1.14 \times 10^{-3}$ | $6.44 \times 10^{-4}$ | $1.69 \times 10^{-4}$ |

Examples 7-10

In Example 7-10, several optical recording mediums were manufactured using the recording material of $Bi_{36}Ge_{3.3}O_{60.7}$ of Examples 2. The key factors of Examples 7-10 are summarized in Table 2. In Example 7, the optical recording medium did not include the dielectric layer, and thus the recording layer was formed directly on the first passivation layer. In Example 8, the optical recording medium did not include the first passivation layer. The optical recording mediums of Examples 9-10 were formed in structures similar to the structures of the optical recording mediums of Example 1-6.

The optical recording medium of Example 7, which did not include the dielectric layer, failed because the error rate was too high to be measured by the ODU-1000. However, the optical recording medium of Example 8 may be utilized as a result of having a sufficient low error rate, even though it did not include a first passivation layer. One the features of the present disclosure involves the dielectric layer facilitating correct writing on the recording layer. Examples 9-10 respectively exhibited error rates (RSER) of $2.54 \times 10^{-4}$ and $5.31 \times 10^{-4}$.

TABLE 2

|  |  | Example 7 | Example 8 | Example 9 | Example 10 |
|---|---|---|---|---|---|
| First passivation layer | Material | TiO$_2$ | — | TiO$_2$ | TiO$_2$ |
|  | Refractive index | 2.5 | — | 2.5 | 2.5 |
|  | Extinction coefficient | 0.06 | — | 0.06 | 0.06 |
|  | Thickness (nm) | 18 | — | 19.1 | 17.8 |
| Dielectric layer | Material | — | ZnS—SiO$_2$ | ZnS—SiO$_2$ | InZrSiO |
|  | Refractive index | — | 2.3 | 2.3 | 2.2 |
|  | Extinction coefficient | — | 0.006 | 0.006 | 0.006 |
|  | Thickness (nm) | — | 55 | 35 | 36.3 |
| Recording layer | Material | | Bi$_{36}$Ge$_{3.3}$O$_{60.7}$ | | |
|  | Refractive index | 2.7 | 2.7 | 2.7 | 2.7 |
|  | Extinction coefficient | 0.125 | 0.125 | 0.125 | 0.125 |
|  | Thickness (nm) | 28.6 | 24.2 | 24.2 | 24.2 |
| Second passivation layer | Material | TiO$_2$ | TiO$_2$ | TiO$_2$ | TiO$_2$ |
|  | Refractive index | 2.5 | 2.5 | 2.5 | 2.5 |
|  | Extinction coefficient | 0.06 | 0.06 | 0.06 | 0.06 |
|  | Thickness (nm) | 18 | 16.9 | 14.6 | 16 |
| RSER result | | Fail | $2.22 \times 10^{-3}$ | $2.54 \times 10^{-4}$ | $5.31 \times 10^{-4}$ |

Examples 11-12

In Examples 11-12, the optical recording mediums had structures similar to the structures of the optical recording mediums of Examples 1-6. However, niobium oxide was employed as the first passivation layer in Example 11 and titanium oxide was applied as the first passivation layer in Example 12. Both Examples may be utilized as a result of having sufficiently low error rates, but Example 12 exhibited a lower error rate (RSER) than Example 11. The key parameters and the results of Examples 11-12 are summarized in Table 3.

TABLE 3

|  |  | Example 11 | Example 12 |
|---|---|---|---|
| First passivation layer | Material | Niobium oxide | TiO$_2$ |
|  | Refractive index | 2.45 | 2.5 |
|  | Extinction coefficient | 0.03 | 0.06 |
|  | Thickness (nm) | 18 | 19 |
| Dielectric layer | Material | ZnS—SiO$_2$ | |
|  | Refractive index | 2.3 | |

TABLE 3-continued

|  |  | Example 11 | Example 12 |
|---|---|---|---|
|  | Extinction coefficient | 0.006 | |
|  | Thickness (nm) | 35 | |
| Recording layer | Material | Bi$_{36}$Ge$_{3.3}$O$_{60.7}$ | |
|  | Refractive index | 2.7 | |
|  | Extinction coefficient | 0.125 | |
|  | Thickness (nm) | 22 | |
| Second passivation layer | Material | TiO$_2$ | TiO$_2$ |
|  | Refractive index | 2.5 | 2.5 |
|  | Extinction coefficient | 0.06 | 0.06 |
|  | Thickness (nm) | 15.8 | 14.6 |
| RSER result | | $1.74 \times 10^{-3}$ | $1.65 \times 10^{-4}$ |

Example 13

In this example, the optical recording medium was formed in a structure similar to the structures of the optical recording medium of Examples 1-6, except that the first passivation layer was composed of two sub-layers (i.e., sub-layer 1 and sub-layer 2). The sub-layer 1 and sub-layer 2 were respectively made of niobium oxide and TiO$_2$. The detailed parameters and the result of Example 13 are summarized in Table 4. Example 13 exhibited an error rate (RSER) of $2.01 \times 10^{-4}$.

TABLE 4

|  |  |  | Example 13 |
|---|---|---|---|
| First passivation layer | sub-layer 1 | Material | Niobium oxide |
|  |  | Refractive index | 2.45 |
|  |  | Extinction coefficient | 0.03 |
|  |  | Thickness (nm) | 1.5 |
|  | sub-layer 2 | Material | TiO$_2$ |
|  |  | Refractive index | 2.5 |
|  |  | Extinction coefficient | 0.06 |
|  |  | Thickness (nm) | 17.6 |
| Dielectric layer |  | Material | ZnS—SiO2 |
|  |  | Refractive index | 2.3 |
|  |  | Extinction coefficient | 0.006 |
|  |  | Thickness (nm) | 35 |
| Recording layer |  | Material | Bi$_{36}$Ge$_{3.3}$O$_{60.7}$ |
|  |  | Refractive index | 2.7 |
|  |  | Extinction coefficient | 0.125 |
|  |  | Thickness (nm) | 22 |
| Second passivation layer |  | Material | TiO$_2$ |
|  |  | Refractive index | 2.5 |
|  |  | Extinction coefficient | 0.06 |
|  |  | Thickness (nm) | 15.8 |
| RSER result |  |  | $2.01 \times 10^{-4}$ |

Examples 14-22

In Examples 14-22, the optical recording mediums had structures similar to the structures of the optical recording mediums of Examples 1-6. The thicknesses of the first passivation layer, the dielectric layer, the recording layer and the second passivation layer were varied. In these examples, the thickness of the first passivation layer was ranged from 16.9 nm to 21.4 nm. The thickness of the dielectric layer was ranged from 30 nm to 38 nm. The thickness of the recording layer was ranged from 22 nm to 28.6 nm. The thickness of second passivation layer was ranged from 14.6 nm to 19.1 nm. The error rates (RSER) of these examples were in the range of about $10^{-3}$ to about $10^{-4}$. The detailed parameters and the results of Examples 14-22 are summarized in Table 5.

TABLE 5

| | | Example | | | | | | | | |
|---|---|---|---|---|---|---|---|---|---|---|
| | | 14 | 15 | 16 | 17 | 18 | 19 | 20 | 21 | 22 |
| First passivation layer, | Material | | | | | TiO2 | | | | |
| | Refractive index | | | | | 2.5 | | | | |
| | Extinction coefficient | | | | | 0.06 | | | | |
| | Thickness (nm) | 16.9 | 19.1 | 21.4 | 19.1 | 19.1 | 19.1 | 19.1 | 19.1 | 19.1 |
| Dielectric layer | Material | | | | | ZnS—SiO2 | | | | |
| | Refractive index | | | | | 2.3 | | | | |
| | Extinction coefficient | | | | | 0.006 | | | | |
| | Thickness (nm) | 35 | 35 | 35 | 30 | 38 | 35 | 35 | 35 | 35 |
| Recording layer | Material | | | | | $Bi_{36}Ge_{3.3}O_{60.7}$ | | | | |
| | Refractive index | | | | | 2.7 | | | | |
| | Extinction coefficient | | | | | 0.125 | | | | |
| | Thickness (nm) | 24.2 | 24.2 | 24.2 | 24.2 | 24.2 | 22 | 28.6 | 24.2 | 24.2 |
| Second passivation layer | Material | | | | | TiO2 | | | | |
| | Refractive index | | | | | 2.5 | | | | |
| | Extinction coefficient | | | | | 0.06 | | | | |
| | Thickness (nm) | 16.9 | 16.9 | 16.9 | 16.9 | 16.9 | 16.9 | 16.9 | 14.6 | 19.1 |
| RSER result | | $1.43 \times 10^{-3}$ | $7.52 \times 10^{-4}$ | $6.53 \times 10^{-4}$ | $1.92 \times 10^{-3}$ | $9.11 \times 10^{-4}$ | $8.75 \times 10^{-4}$ | $1.15 \times 10^{-3}$ | $2.48 \times 10^{-4}$ | $4.60 \times 10^{-3}$ |

Example 23

In this example, the optical recording medium was formed in a structure similar to that depicted in FIG. 2, except that only two recording structures were employed. Briefly, the optical recording medium of Example 23 included a first recording structure, a second recording structure and a spacer layer disposed there between. The first recording structure included in sequence a first passivation layer, a first dielectric layer, a first recording layer and a second passivation layer. Similarly, the second recording structure included in sequence a third passivation layer, a second dielectric layer, a second recording layer and a fourth passivation layer, with the third passivation layer being situated on the spacer layer. The key parameters and the results of Example 23 are summarized in Table 6. In this example, the first recording structure exhibited an error rate (RSER) of $5.26 \times 10^{-4}$, and the second recording structure exhibited an error rate (RSER) of $4.44 \times 10^{-4}$.

TABLE 6

| First recording structure | | | Second recording structure | | |
|---|---|---|---|---|---|
| First passivation layer, | Material | $TiO_2$ | Third passivation layer | Material | $TiO_2$ |
| | Refractive index | 2.5 | | Refractive index | 2.5 |
| | Extinction coefficient | 0.06 | | Extinction coefficient | 0.06 |
| | Thickness (nm) | 19.2 | | Thickness (nm) | 19.2 |
| First dielectric layer | Material | ZnS—$SiO_2$ | Second dielectric layer | Material | ZnS—$SiO_2$ |
| | Refractive index | 2.3 | | Refractive index | 2.3 |
| | Extinction coefficient | 0.006 | | Extinction coefficient | 0.006 |
| | Thickness (nm) | 35 | | Thickness (nm) | 35 |
| First recording layer | Material | $Bi_{36}Ge_{3.3}O_{60.7}$ | Second recording layer | Material | $Bi_{36}Ge_{3.3}O_{60.7}$ |
| | Refractive index | 2.7 | | Refractive index | 2.7 |
| | Extinction coefficient | 0.125 | | Extinction coefficient | 0.125 |
| | Thickness (nm) | 24.2 | | Thickness (nm) | 28.6 |

TABLE 6-continued

| First recording structure | | | Second recording structure | | |
|---|---|---|---|---|---|
| Second passivation layer | Material | TiO$_2$ | Fourth passivation layer | Material | TiO$_2$ |
| | Refractive index | 2.5 | | Refractive index | 2.5 |
| | Extinction coefficient | 0.06 | | Extinction coefficient | 0.06 |
| | Thickness (nm) | 14.6 | | Thickness (nm) | 14.6 |
| RSER result | | 5.26 × 10$^{-4}$ | RSER result | | 4.44 × 10$^{-4}$ |

Example 24

In this example, the optical recording medium was formed in a structure identical to that depicted in FIG. 2. The optical recording medium included three recording structures. The key parameters and the results of this example are summarized in Table 7. In this example, the first recording structure exhibited an error rate (RSER) of 3.26×10$^{-4}$, and the second recording structure exhibited an error rate (RSER) of 9.58× 10$^{-4}$, and the third recording structure exhibited an error rate (RSER) of 3.29×10$^{-4}$.

TABLE 7

| First recording structure | | | Second recording structure | | | Third recording structure | | |
|---|---|---|---|---|---|---|---|---|
| First passivation layer, | Material | TiO$_2$ | Third passivation layer | Material | TiO$_2$ | Fifth passivation layer | Material | TiO$_2$ |
| | Refractive index | 2.5 | | Refractive index | 2.5 | | Refractive index | 2.5 |
| | Extinction coefficient | 0.06 | | Extinction coefficient | 0.06 | | Extinction coefficient | 0.06 |
| | Thickness (nm) | 18 | | Thickness (nm) | 20.3 | | Thickness (nm) | 18 |
| First dielectric layer | Material | ZnS—SiO$_2$ | Second dielectric layer | Material | ZnS—SiO$_2$ | Third dielectric layer | Material | ZnS—SiO$_2$ |
| | Refractive index | 2.3 | | Refractive index | 2.3 | | Refractive index | 2.3 |
| | Extinction coefficient | 0.006 | | Extinction coefficient | 0.006 | | Extinction coefficient | 0.006 |
| | Thickness (nm) | 35 | | Thickness (nm) | 35 | | Thickness (nm) | 35 |
| First recording layer | Material | Bi$_{36}$Ge$_{3.3}$O$_{60.7}$ | Second recording layer | Material | Bi$_{36}$Ge$_{3.3}$O$_{60.7}$ | Third recording layer | Material | Bi$_{36}$Ge$_{3.3}$O$_{60.7}$ |
| | Refractive index | 2.7 | | Refractive index | 2.7 | | Refractive index | 2.7 |
| | Extinction coefficient | 0.125 | | Extinction coefficient | 0.125 | | Extinction coefficient | 0.125 |
| | Thickness (nm) | 28.6 | | Thickness (nm) | 28.6 | | Thickness (nm) | 24.2 |
| Second passivation layer | Material | TiO$_2$ | Fourth passivation layer | Material | TiO$_2$ | Sixth passivation layer | Material | TiO$_2$ |
| | Refractive index | 2.5 | | Refractive index | 2.5 | | Refractive index | 2.5 |
| | Extinction coefficient | 0.06 | | Extinction coefficient | 0.06 | | Extinction coefficient | 0.06 |
| | Thickness (nm) | 14.6 | | Thickness (nm) | 14.6 | | Thickness (nm) | 13.5 |
| RSER result | | 3.26 × 10$^{-4}$ | RSER result | | 9.58 × 10$^{-4}$ | RSER result | | 3.29 × 10$^{-4}$ |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical recording medium, comprising:
a substrate;
a first passivation layer disposed on the substrate;
a second passivation layer disposed over the first passivation layer;
a dielectric layer disposed between the first and the second passivation layers, and having a refractive index of about 2.0 to about 2.5; and
a recording layer in contact with the dielectric layer, and having a refractive index of about 2.5 to about 3.0, wherein the recording layer comprises a material represented by a composition formula of Bi$_x$Ge$_y$O$_{(1-x-y)}$, wherein x and y respectively represent atomic ratios of bismuth and germanium, and satisfy the requirements of the following formulae: $2.8 \leqq (x/y) \leqq 25$ and $0.55 \leqq (1-x-y) < 0.62$.

2. The optical recording medium according to claim 1, wherein each of the first and second passivation layers has a refractive index of about 2.0 to about 2.7.

3. The optical recording medium according to claim 1, wherein a difference between the refractive index of the recording layer and the refractive index of the dielectric layer is about 0.25 to about 0.55.

4. The optical recording medium according to claim 1, wherein at least one of the first and second passivation layers comprises at least one material selected from the group consisting of zinc sulfide (ZnS), silicon dioxide (SiO$_2$), chromium oxide (Cr$_2$O$_3$), zirconium dioxide (ZrO$_2$), titanium dioxide (TiO$_2$), niobium pentaoxide (Nb$_2$O$_5$), tantalum pentoxide (Ta$_2$O$_5$), indium oxide (In$_2$O$_3$), zinc oxide (ZnO), tin dioxide (SnO$_2$), cerium dioxide (CeO$_2$) and aluminum oxide (Al$_2$O$_3$).

5. The optical recording medium according to claim 1, wherein the dielectric layer comprises a material selected from the group consisting of zinc sulfide (ZnS), silicon dioxide (SiO$_2$), chromium oxide (Cr$_2$O$_3$), zirconium dioxide (ZrO$_2$), titanium dioxide (TiO$_2$), niobium pentaoxide (Nb$_2$O$_5$), tantalum pentoxide (Ta$_2$O$_5$), indium oxide (In$_2$O$_3$), zinc oxide (ZnO), tin dioxide (SnO$_2$), cerium dioxide (CeO$_2$), aluminum oxide (Al$_2$O$_3$) and a combination thereof.

6. The optical recording medium according to claim 1, wherein the dielectric layer has a thickness of about 30 nm to about 40 nm.

7. The optical recording medium according to claim 1, wherein the recording layer has a thickness of about 15 nm to about 30 nm.

8. An optical recording medium, comprising:
   a substrate;
   a first recording structure, comprising:
      a first dielectric layer disposed over the substrate; and
      a first recording layer disposed on and in contact with the first dielectric layer:
   a second recording structure arranged over the first recording structure, and comprising:
      a second dielectric layer disposed over the first recording layer; and
      a second recording layer disposed on and in contact with the second dielectric layer;
   a third recording structure arranged over the second recording structure, and comprising:
      a third dielectric layer disposed over the second recording layer; and
      a third recording layer disposed on and in contact with the third dielectric layer; and
   a first, a second, a third, a fourth, a fifth and a sixth passivation layer, wherein the first and second passivation layers are respectively disposed below and above the first recording structure, the third and fourth passivation layers are respectively disposed below and above the second recording structure, and the fifth and sixth passivation layers are respectively disposed below and above the third recording structure;
   wherein each of the first, second and third recording layers has an extinction coefficient of less than or equal to 0.3 and comprises a material represented by a composition formula of Bi$_x$Ge$_y$O$_{(1-x-y)}$, wherein x and y respectively represent atomic ratios of bismuth and germanium, and satisfy the requirements of the following formulae: $2.8 \leq (x/y) \leq 25$ and $0.55 \leq (1-x-y) < 0.62$; and
   wherein each of the first, second and third dielectric layers has a refractive index of about 2.0 to about 2.5.

9. The optical recording medium according to claim 8, wherein each of the first, second, third, fourth, fifth and sixth passivation layers has a refractive index of about 2.0 to about 2.7.

10. The optical recording medium according to claim 8, wherein x and y in the composition formula satisfy the requirements of the following formulae: $0.2 \leq x \leq 0.4$ and $0.01 \leq y \leq 0.15$.

11. The optical recording medium according to claim 8, wherein the third recording layer has a thickness less than a thickness of each of the first and second recording layers.

12. The optical recording medium according to claim 8, wherein each of the first, second and third dielectric layers has a thickness greater than a thickness of each of the first, second and third recording layers.

* * * * *